(12) United States Patent
Panigrahi et al.

(10) Patent No.: US 10,863,531 B2
(45) Date of Patent: Dec. 8, 2020

(54) METHOD AND SYSTEM FOR DELAY AWARE UPLINK SCHEDULING IN A COMMUNICATION NETWORK

(71) Applicant: Tata Consultancy Services Limited, Mumbai (IN)

(72) Inventors: Bighnaraj Panigrahi, Bangalore (IN); Hemant Kumar Rath, Bhubaneswar (IN); Arpan Pal, Kolkata (IN); Samar Shailendra, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 55 days.

(21) Appl. No.: 16/216,756

(22) Filed: Dec. 11, 2018

(65) Prior Publication Data
US 2019/0320445 A1  Oct. 17, 2019

(30) Foreign Application Priority Data
Mar. 15, 2018  (IN) .............................. 201821009531

(51) Int. Cl.
*H04W 72/12* (2009.01)
*H04W 24/08* (2009.01)

(52) U.S. Cl.
CPC ....... *H04W 72/1231* (2013.01); *H04W 24/08* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2005/0152373 A1* | 7/2005 | Ali | H04L 47/10 370/395.4 |
| 2008/0095247 A1* | 4/2008 | Ohno | H04L 1/0002 375/240.28 |

(Continued)

FOREIGN PATENT DOCUMENTS

| | | |
|---|---|---|
| CN | 104507172 | 4/2015 |
| CN | 105188150 | 12/2015 |
| CN | 106686664 | 5/2017 |

OTHER PUBLICATIONS

EPO search opinion for application: 18 211 008.0. Form 1507. (dated Year: 2018).*

(Continued)

*Primary Examiner* — Andre Tacdiran
(74) *Attorney, Agent, or Firm* — Finnegan, Henderson, Farabow, Garrett & Dunner, LLP

(57) ABSTRACT

This disclosure relates generally to telecommunication networks, and more particularly to a method and system for delay aware uplink scheduling in a communication network. The telecommunication network performs data uplink and data downlink associated with data communication between multiple transmitter-receiver pairs connected to the network, by using specific scheduling schema as part of the data processing. Disclosed are method and system for performing a delay-aware uplink scheduling in the communication network. For an uplink request received from a transmitter, the system estimates downlink delay at the corresponding receiver side. The system further estimates a processing delay for the received uplink request. Based on the estimated downlink delay and the processing delay, the system determines an uplink delay budget for the transmitter. Further, based on the uplink delay budget and an achievable data rate computed for the transmitter, the system schedules uplink for the transmitter.

5 Claims, 4 Drawing Sheets

Communication network 100

(56) References Cited

U.S. PATENT DOCUMENTS

| | | | |
|---|---|---|---|
| 2010/0135232 A1* | 6/2010 | Fan | H04L 47/10 370/329 |
| 2011/0075579 A1* | 3/2011 | Seymour | H04L 41/5019 370/252 |
| 2015/0282144 A1* | 10/2015 | Tomeba | H04B 7/0456 370/329 |
| 2017/0064653 A1* | 3/2017 | Griffioen | H04W 56/002 |
| 2018/0262437 A1* | 9/2018 | Han | H04L 49/254 |
| 2019/0098542 A1* | 3/2019 | Tang | H04W 72/0466 |
| 2019/0116568 A1* | 4/2019 | Fertonani | H04W 56/00 |
| 2019/0182836 A1* | 6/2019 | Shimada | H04Q 11/0067 |
| 2019/0230657 A1* | 7/2019 | Kim | H04W 76/27 |

OTHER PUBLICATIONS

Aijaz, A. et al. (Apr. 2017.) "Realizing the Tactile Internet: Haptic Communications over Next Generation 5G Cellular Networks," *IEEE Wireless Communications*, vol. 24, issue 2 (8 pages).

\* cited by examiner

Communication network 100

METHOD AND SYSTEM FOR DELAY AWARE UPLINK SCHEDULING IN A COMMUNICATION NETWORK

PRIORITY CLAIM

This U.S. patent application claims priority under 35 U.S.C. § 119 to: India Application No. 201821009531, filed on Mar. 15, 2018. The entire contents of the aforementioned application are incorporated herein by reference.

TECHNICAL FIELD

This disclosure relates generally to telecommunication networks, and more particularly to a method and system for delay-aware uplink scheduling in telecommunication networks.

BACKGROUND

Traffic scheduling (or 'Scheduling') is a well-known mechanism used in telecommunication networks so as to schedule allocation of resources or slots to communication devices in the network, for establishing communication. There are different types of scheduling mechanisms currently being used in the telecommunication sector, wherein parameter(s) being considered for scheduling the resources, by each of the scheduling mechanisms, may be different.

For example, when one or more of the scheduling mechanisms performs scheduling of the resources based on traffic classes and channel conditions, other scheduling mechanisms consider parameters such as but not limited to pricing, energy usage, coverage and capacity of network and so on. Each scheduling mechanism has its own advantages and disadvantages. Based on requirements of the network, appropriate scheduling mechanism(s) can be selected and used.

The 'requirements of the network' also can vary from one implementation/application to another. For example, certain applications for which the communication network is being used can be of 'critical' type, with zero or minimum tolerance to delays involved. For example, consider a haptic communication network based robotic tele-surgery application. In this case, a doctor who is performing a surgery may be at a location different from that of the patient. The doctor, using a pair of haptic gloves or using a joystick, communicates with a robot that is near the patient. The doctor's actions are captured, and are transmitted digitally over a communication network to the robot. The robot receives and processes the data, during which the data in digital format is transformed to raw format, and is applied on or is performed on the patient. That means the doctor performs surgery from a different location than that of the patient. Such applications and critical and time-sensitive, and any delay exceeding a permitted limit can prove fatal. It appears the existing scheduling mechanisms fail to provide a mechanism to reduce delays while scheduling resources.

SUMMARY

Embodiments of the present disclosure present technological improvements as solutions to one or more of the above-mentioned technical problems recognized by the inventors in conventional systems. For example, in one aspect, a processor-implemented method for uplink scheduling in a communication network is provided. In this method, downlink delay for a transmitter-receiver pair communication in the communication network is estimated by performing a downlink delay estimation, in response to an uplink request received from a transmitter of the transmitter-receiver pair in the communication network, via one or more hardware processors. Further, a processing delay in the communication network is estimated, via the one or more hardware processors. Further, based on the estimated downlink delay and the processing delay, and a channel data rate, uplink of the transmitter is scheduled.

In another aspect, a communication framework is provided. The communication network includes a processing module which further includes a plurality of hardware processors; and a memory module comprising a plurality of instructions. The plurality of instructions cause at least one of the plurality of hardware processors to initially estimate downlink delay for a transmitter-receiver pair communication in the communication network, for a transmitter-receiver pair in the communication network, by performing a downlink delay estimation, using a delay estimation module of the communication framework. The plurality of instructions further cause estimation of a processing delay in the communication network, using the delay estimation module. The plurality of instructions further cause scheduling of uplink of a transmitter of the transmitter-receiver pair, based on the estimated downlink delay, the processing delay, and a channel data rate, using a scheduling module of the communication framework.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
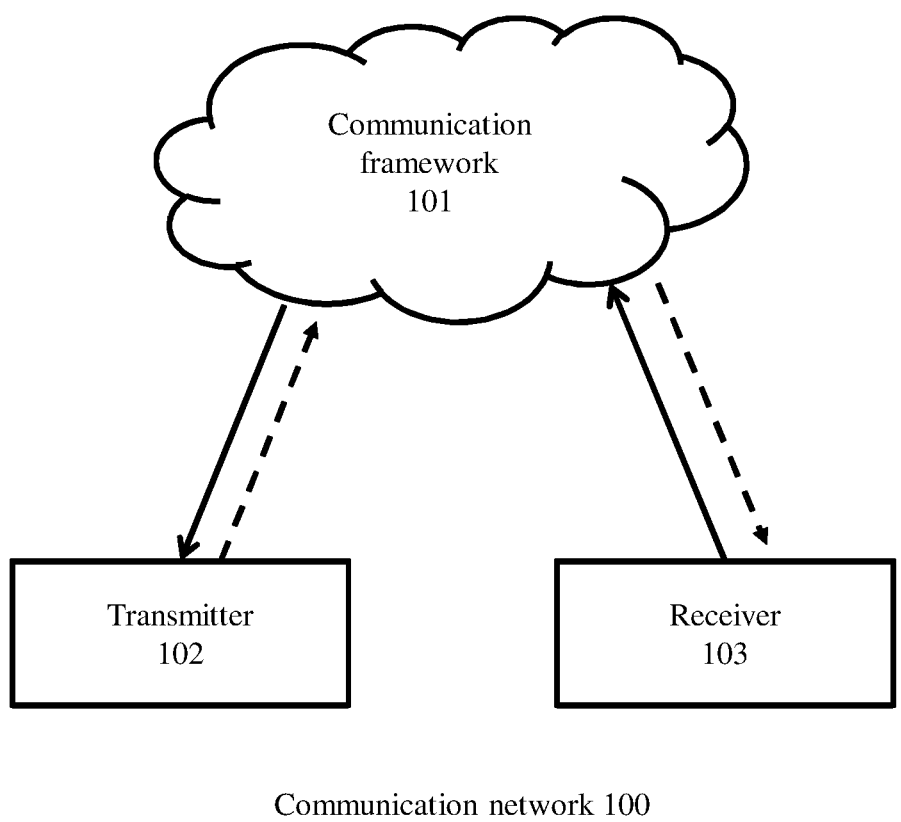
FIG. 1 illustrates an exemplary block diagram of a communication network in which delay-aware scheduling is performed, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

FIG. 1 illustrates an exemplary block diagram of a communication network in which delay-aware scheduling is performed, according to some embodiments of the present disclosure. The communication network 100 includes a transmitter 102, a receiver 103, and a communication framework 101.

It is to be noted that the terminologies used to represent each of the components is for illustration purpose only, and can vary according to implementation standards/requirements. For example, if the delay-aware scheduling mechanism disclosed herein is used in a Long Term Evolution (LTE) communication network, then functionalities of the 'communication framework 101' may be handled by Evolved NodeB (eNB) in the LTE communication network, in addition to standard responsibilities/functionalities of the eNB. Similarly, the communication framework 101 may be handling communication between multiple transmitter-receiver pairs at a time. The number of each of the components of the communication network 100 can vary according to implementation standards/requirements, and the diagram (FIG. 1) does not intend to restrict scope of the invention in any manner.

The transmitter 102 and the receiver 103 may be any suitable User Equipment (UE) such as a mobile phone, haptic devices, and so on, which satisfies all hardware and software requirements to establish a communication with each other via the communication framework 101. When the transmitter-receiver pair is communicating, both uplink and downlink take place in the communication network 100 i.e., there is an uplink communication between the transmitter 102 and the communication framework 101, and a downlink communication between the communication framework 101 and the receiver 103. The transmitter 102 can send an uplink request to the communication framework 101. In an embodiment, the 'transmitter 102 and the receiver 103' are transceivers having data transmission and reception capabilities. In this scenario, the communication framework 101 handles the delay aware uplink scheduling at either ends, and the bold and dotted arrows indicate communication in either directions.

The communication framework 101 receives the uplink request from the transmitter. In an embodiment, the communication framework 101 performs a delay-aware uplink scheduling in which the communication framework 101 determines an uplink delay budget for the transmitter 102, based on estimated values of downlink delay and processing delay corresponding to the received uplink request. Further, based on the determined uplink delay budget and a computed 'achievable data rate (also referred to as 'channel data rate')' of the transmitter 102, schedules uplink for the transmitter 102. The delay-aware uplink scheduling allows the communication framework 101 to schedule resources for communication for the transmitter-receiver pair, without exceeding a permitted delay as indicated by a delay budget, wherein the delay budget for the transmitter 102 is determined based on application the transmitter 102 is running for.

Figure 2:
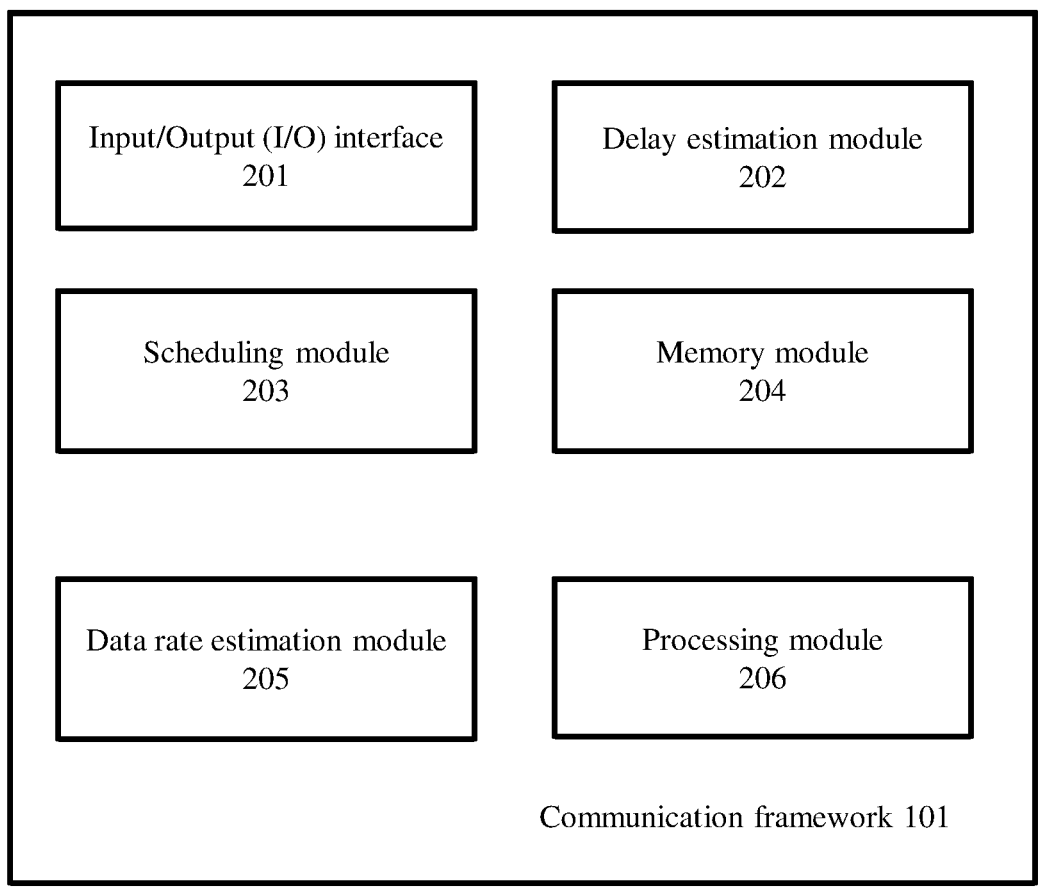
FIG. 2 is a functional block diagram depicting components of a communication framework of the communication network of FIG. 1, according to some embodiments of the present disclosure.

FIG. 2 is a functional block diagram depicting components of a communication framework of the communication network of FIG. 1, according to some embodiments of the present disclosure. The communication framework 101 includes an Input/Output (I/O) interface 201, a delay estimation module 202, a scheduling module 203, a memory module 204, a data rate estimation module 205, and a processing module 206.

The delay estimation module 102 is configured to perform delay estimation in response to an uplink request received from a transmitter 102. For any transmitter-receiver pair communication, total delay budget $(D_{t,i})$ is defined as end to end latency allowed for that communication, and is estimated a combination of uplink delay, downlink delay, and processing delay.

i.e. $D_{t,i} = D_{u,i} + D_{d,i} + D_p$     (1)

where $D_{u,i}$→uplink delay $D_{d,i}$→downlink delay $D_p$→processing delay

The delay estimation module 102 estimates the downlink delay as well as processing delay. Based on the estimated values of downlink delay and processing delay, remaining delay budget for uplink can be estimated, and the uplink can be scheduled accordingly.

The delay estimation module 102 estimates the downlink delay for a transmitter-receiver pair, as explained below:

Downlink Delay Estimation:

In an embodiment, the delay estimation module 102 estimates total downlink delay caused due to two factors: due to downlink traffic, and due to channel quality.

a) Downlink traffic based delay estimation (also referred to as a 'first downlink delay'):

b) When multiple UEs (i.e., receivers 103) arrive with downlink requests for resources in terms of sub-frames, each UE needs to wait in a queue so as to get resources. Average waiting time in queue per UE corresponds to downlink traffic delay. Assume that downlink UEs/receivers 103 arrive at a rate λ. X denotes average number of slots required per customer/UE/receiver 103. Then the average waiting time is calculated as:

$$D_{Tr} = \frac{\lambda E[X^2]}{2(1-\rho)} \quad (2)$$

Where $\rho = \lambda E[X^2]$ is utilization factor and $E[X^2]$ is second moment of X.

c) Downlink channel quality based delay estimation (also referred to as a 'second downlink delay'):

d) Based on variation in link characteristics between the receiver 103 and the communication framework 101, the delay estimation module 202 estimates and predicts an expected signal condition for the downlink communication/transmission. The delay estimation module 202 considers history readings of signal strength for the receiver 103, and based on the history data, predicts downlink signal strength for next instance of time. Assume that $\{Y_i(1), Y_i(2), \ldots, Y_i(t)\}$ represents history of Received Signal Strength Indicator (RSSI) for the receiver 103. Then, RSSI for next time instance (t+1) is estimated as:

$Y_i(t+1) = \Sigma_{s=0}^{t} \alpha(1-\alpha)^s * Y_i(t-s)$     (3)

where $0 \leq \alpha \leq 1$, is soothing factor;

After identifying the downlink channel quality, the delay estimation module 202 estimates expected channel quality at time (t+1) for the downlink communication as:

$$\zeta i(t+1) = W \log_2\left(1 + \frac{Y_j(t+1)}{N_0 W}\right) \quad (4)$$

where $Y_i(t+1)$ denotes the predicted RSSI at time $(t+1)$. $N_0$ denotes noise power spectral density, and W denotes channel bandwidth in hertz. Based on the estimated value of $\zeta_i$, a modulation and coding scheme is decided, which in turn decides transmission rate, $R_i(t+1)$. Accordingly, the delay estimation module 202 estimates the downlink transmission delay as:

$$D_{Tl,i} = \frac{L_i}{R_i(t+1)} \quad (5)$$

Where $L_i$ denotes the number of bits required to be transmitted by the receiver 103

The delay estimation module 202 then estimates the total downlink delay i.e. downlink delay for the transmitter-receiver pair communication, as:

$$D_{d,i} = D_{Tr} + D_{Tl,i} \quad (6)$$

The delay estimation module 202 then estimates processing delay ($D_p$) for the transmitter-receiver pair communication. The processing delay represents total execution time required for processing uplink frames from the transmitter 102, and for creating corresponding downlink frames for transmission, and is mostly a fixed value. $D_p$ can be computed by the processing module 206 by parsing uplink data frames from the transmitter 102. The uplink data frames include communication resources where data from the transmitter 102 are transmitted during the uplink.

The scheduling module 203 computes residual uplink delay budget for each transmitter 102, based on the estimated downlink delay and the processing delay. The scheduling module 203 then determines optimum utility of the transmitter 102, based on a utility function, in order to schedule uplink frames. The utility function for a transmitter 102 is expressed as:

$$u_{ij} = \left(v_1 \frac{R_{ij}}{R_{imax}} * \frac{F_{ij}}{F_{jmax}} - v_2 \frac{D'_{u,i}}{D_{imax}}\right) * x_{ij} \quad (7)$$

where, $R_{ij}$ is instantaneous transmission rate for the transmitter 102 on frame j, and $R_{imax}$ denotes maximum possible transmission rate for the transmitter 102. $F_{ij}$ and $F_{jmax}$ denote traffic flow of the transmitter 102, and the total traffic flow in frame j, respectively. u1 and u2 denote scaling factors for transmission rate and delay limit, respectively, and can be tuned to vary weightage as per requirements. The 'requirements' may be application specific. For example, for some applications on the transmitter 102, the delay constraint is more than u2>>u1, whereas for some other applications high data rate is required i.e. u1>>u2. xij is resource allocation factor, which is in the form of a binary metric. Value of xij=1, if the transmitter 102 is scheduled in the frame j, and '0' otherwise.

The scheduling module 203 then schedules uplink for the transmitter 102, based on an optimal scheduling model, which is represented as:

$$\text{Maximize} \sum_{j=1}^{M}\sum_{i=1}^{N} u_{ij} = \sum_{j=1}^{M}\sum_{i=1}^{N}\left(v_1 \frac{R_{ij}}{R_{imax}} * \frac{F_{ij}}{F_{jmax}} - v_2 \frac{D'_{u,i}}{D_{imax}}\right) * x_{ij} \quad (8)$$

Assuming there are N users for uplink and M total resources in the uplink data frame which is to be filled with users' uplink data. The optimal scheduling model computes the utility value for each transmitter 102(i) on a resource j and then optimally fills the all transmitters 102 that are transmitting at the moment, on specific resources so as to maximize the utilities.

The optimal scheduling model is subject to a few parameters, as given below:

1) Flow Constraint:
   The flow constraint states that sum of total partial flows in a frame cannot exceed maximum possible flow in the frame, and is represented as:

$$\Sigma_{i=1}^{n} F_{ij} * x_{ij} \leq F_{jmax}j \quad (9)$$

2) Energy Constraint:
   The energy constraint states that residual energy left should be at least equal to energy required for packet transmission, and is expressed as:

$$\varepsilon_i \geq \varepsilon_{th} \quad (10)$$

where $\varepsilon_i$ is residual energy of the transmitter 102, and $\varepsilon_{th}$ is minimum energy required for transmission 3) RSSI Constraint:
   For successful reception at the receiver 103, each transmission by the transmitter 102 needs to satisfy the RSSI constraint expressed as:

$$Y_i \geq \psi_{th} \quad (11)$$

where $Y_i$ represents instantaneous RSSI and $\psi_{th}$ is minimum RSSI required for successful reception at the receiver 103.

4) Delay Constraint:
   The delay constraint indicates that the uplink delay should not exceed the fraction of uplink delay budget, and is represented as:

$$D_{u,i} \leq D_{u,i}' \quad (12)$$

Figure 3A:
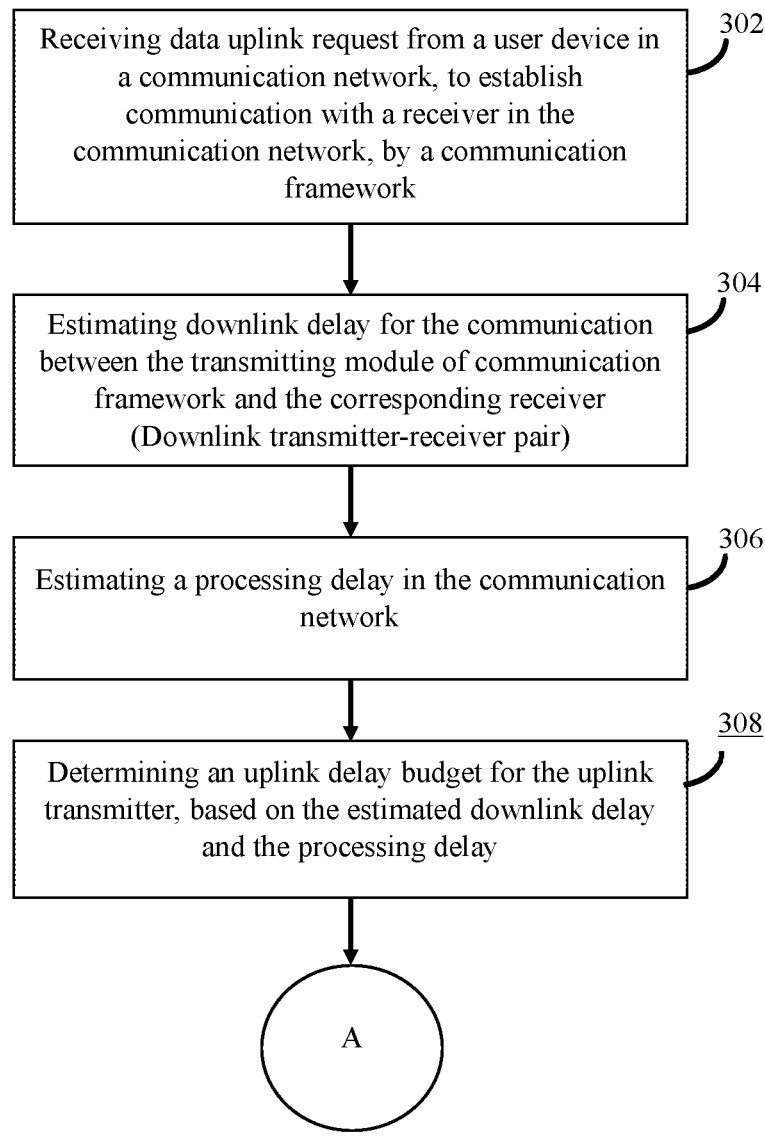
FIGS. 3A and 3B are a flow diagram depicting steps involved in the process of performing the delay-aware scheduling by the communication framework of FIG. 2, in accordance with some embodiments of the present disclosure.
Figure 3B:
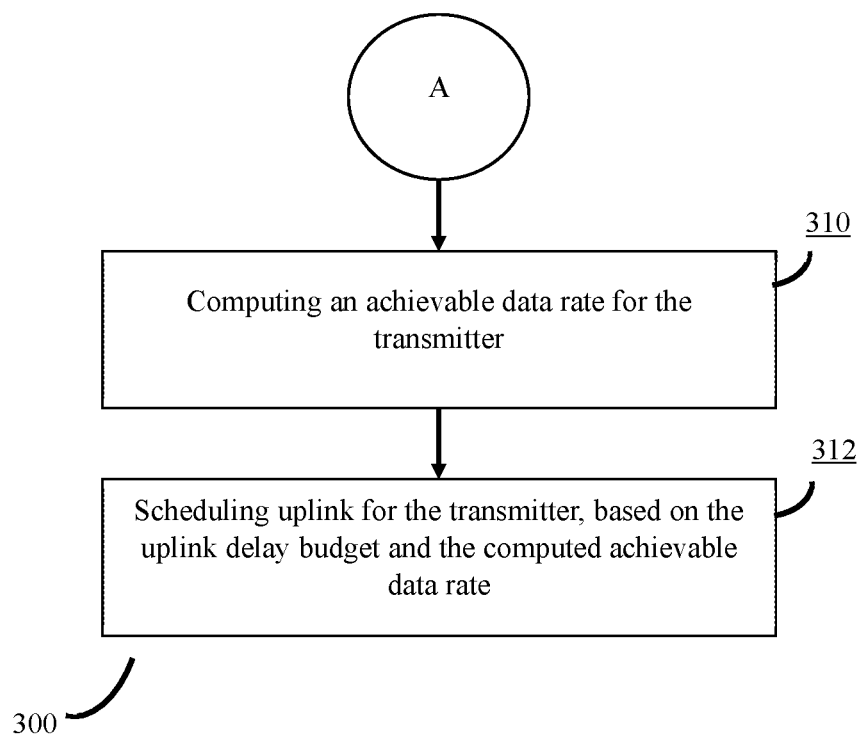

FIGS. 3A and 3B are a flow diagram depicting steps involved in the process of performing the delay-aware scheduling by the communication framework of FIG. 2, in accordance with some embodiments of the present disclosure. In an embodiment, the delay aware uplink scheduling for a transmitter-receiver pair starts when the communication framework 101 receives (302) a data uplink request from a transmitter 102 in the communication network 100, wherein the data uplink request specifies the receiver 103 with which the transmitter 102 is trying to establish communication with. In the next step, for communication for this transmitter-receiver pair (i.e., the transmitter 102 which sent the data uplink request, and the corresponding receiver 103), a downlink delay is estimated (304). Further, for the transmitter-receiver pair, a processing delay is estimated (306). Further, based on the estimated downlink delay and the processing delay, uplink delay budget for the transmitter 102 is determined (308). Further, for the transmitter 102, an achievable data rate is computed (310). Further, uplink of the transmitter 102 is scheduled (312) based on the uplink delay budget and the computed achievable data rate.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of scheduling resources in a telecommunication network. The embodiment, thus provides a method and system for delay-aware uplink scheduling.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for uplink scheduling in a communication network, comprising:
    estimating (304) downlink delay for a transmitter-receiver pair communication in the communication network, in response to an uplink request received from a transmitter of the transmitter-receiver pair in the communication network (302), via one or more hardware processors, wherein the downlink delay estimation comprises estimating the downlink delay due to downlink traffic and channel quality;
    estimating (306) a processing delay for the transmitter-receiver pair communication in the communication network via the one or more hardware processors, wherein the processing delay represents total execution time required for processing uplink frames from the transmitter and for creating corresponding downlink frames for transmission to a receiver; and
    scheduling (312) an uplink for the transmitter, via the one or more hardware processors comprises:
        determining (308) an uplink delay budget for the transmitter, based on the estimated downlink delay and the processing delay;
        computing (310) an achievable data rate for the transmitter; and
        scheduling (312) the uplink for the transmitter, based on the estimated downlink delay, the processing delay, the uplink delay budget for the transmitter and the computed achievable data rate for the transmitter, wherein scheduling the uplink for the transmitter further comprises determining a time at which resources are required for uplink transmission of the transmitter.

2. The method of claim 1, wherein the processing delay is fixed for the communication network.

3. A communication framework (101) for uplink scheduling in a communication network, comprising:
- a processing module (206) comprising one or more hardware processors;
- a memory module (204) comprising a plurality of instructions, wherein the memory module (204) is coupled to the one or more hardware processors;
- a delay estimation module (202), coupled to the one or more hardware processors, configured to:
  - estimate (304) downlink delay for a transmitter-receiver pair communication in the communication network, in response to an uplink request received from a transmitter of the transmitter-receiver pair in the communication network (302), wherein the downlink delay estimation comprises estimating the downlink delay due to downlink traffic and channel quality; and
  - estimate (306) a processing delay for the transmitter-receiver pair communication in the communication network, wherein the processing delay represents total execution time required for processing uplink frames from the transmitter and for creating corresponding downlink frames for transmission to a receiver; and
- a scheduling module (203), coupled to the one or more hardware processors, configured to:
  - determine (308) an uplink delay budget for the transmitter, based on the estimated downlink delay and the processing delay;
  - compute (310) an achievable data rate for the transmitter; and
  - schedule (312) an uplink for the transmitter, based on the estimated downlink delay, the processing delay, the uplink delay budget for the transmitter and the computed achievable data rate for the transmitter, wherein scheduling the uplink for the transmitter further comprises determining a time at which resources are required for uplink transmission of the transmitter.

4. One or more non-transitory machine readable information storage mediums comprising one or more instructions which when executed by one or more hardware processors causes the one or more hardware processors to perform a method for uplink scheduling in a communication network, said method comprising:
- estimating (304) downlink delay for a transmitter-receiver pair communication in the communication network, in response to an uplink request received from a transmitter of the transmitter-receiver pair in the communication network (302), wherein the downlink delay estimation comprises estimating the downlink delay due to downlink traffic and channel quality;
- estimating (306) a processing delay for the transmitter-receiver pair communication in the communication network, wherein the processing delay represents total execution time required for processing uplink frames from the transmitter and for creating corresponding downlink frames for transmission to a receiver; and
- scheduling (312) an uplink for the transmitter by:
  - determining (308) an uplink delay budget for the transmitter, based on the estimated downlink delay and the processing delay;
  - computing (310) an achievable data rate for the transmitter; and
  - scheduling (312) the uplink for the transmitter, based on the estimated downlink delay, the processing delay, the uplink delay budget for the transmitter and the computed achievable data rate for the transmitter, wherein scheduling the uplink for the transmitter further comprises determining a time at which resources are required for uplink transmission of the transmitter.

5. The one or more non-transitory machine readable information storage mediums of claim 4, wherein the processing delay is fixed for the communication network.

* * * * *